United States Patent [19]

Kaminetzky

[11] Patent Number: 4,614,946
[45] Date of Patent: Sep. 30, 1986

[54] RF RECEIVER UTILIZING A MULTIPLE ECHO DELAY LINE

[75] Inventor: Dov A. Kaminetzky, Plainview, N.Y.

[73] Assignee: General Instrument Corporation, New York, N.Y.

[21] Appl. No.: 478,898

[22] Filed: Mar. 25, 1983

[51] Int. Cl.[4] ............................................. G01S 7/30
[52] U.S. Cl. .................................. 343/18 E; 328/152; 324/77 C
[58] Field of Search ................ 343/18 E, 5 SA; 324/77 C, 77 H, 78 E, 78 F; 328/152

[56] References Cited

U.S. PATENT DOCUMENTS 3,641,515 2/1972 Sues ........................... 324/77 C X
3,939,411 2/1976 James ......................... 343/18 E X
4,117,409 9/1978 O'Brien ............................. 328/56

Primary Examiner—Thomas H. Tarcza
Assistant Examiner—Mark Hellner
Attorney, Agent, or Firm—Hopgood, Calimafde, Kalil, Blaustein & Judlowe

[57] ABSTRACT

An rf receiver includes a multiple echo delay line, a switch, an rf activity detector, and a measurement receiver. A received rf signal initially impinges on the delay line but after a brief delay the detected rf signal actuates a switch, which disconnects the delay line from the input and connects it to the input of the measurement receiver, which receives and processes the multiple signal echos from the delay line.

4 Claims, 1 Drawing Figure

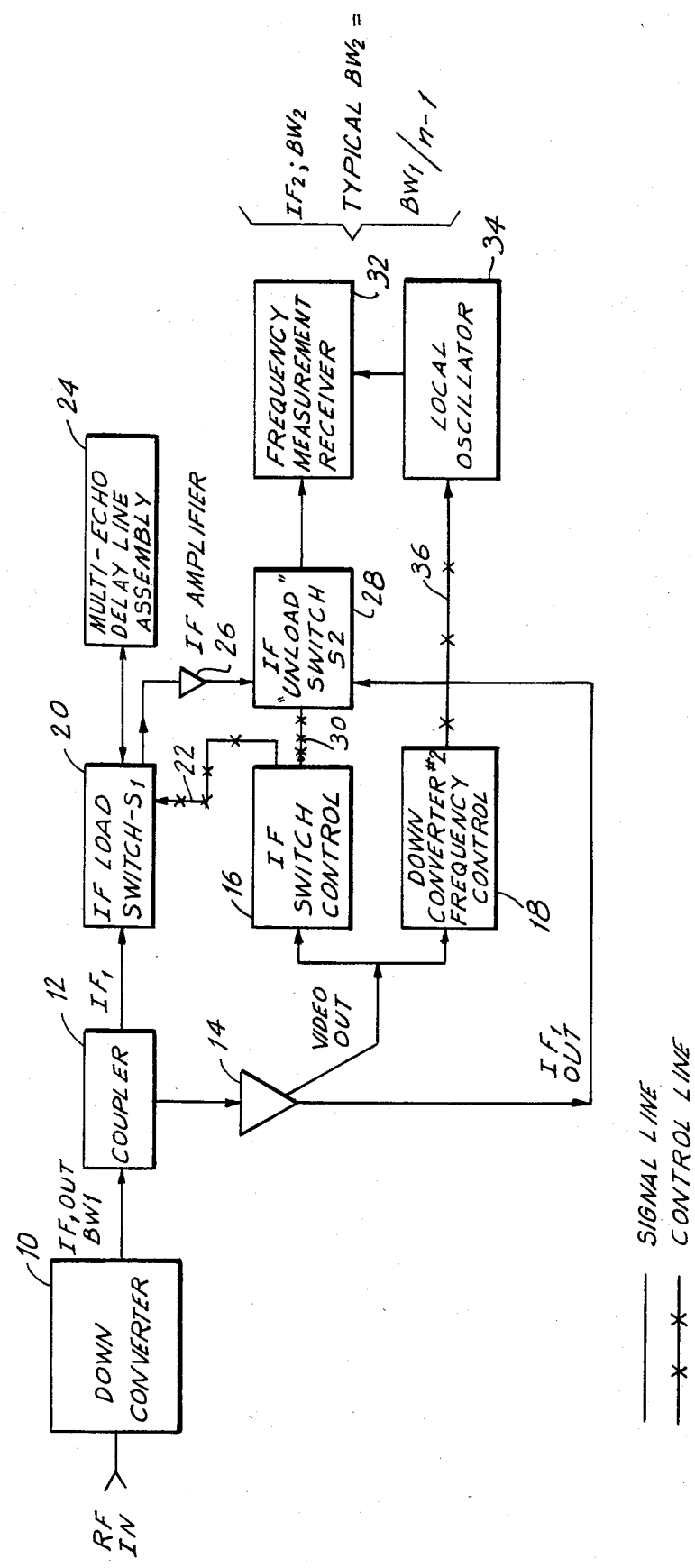

RF RECEIVER UTILIZING A MULTIPLE ECHO DELAY LINE

The present invention relates generally to rf receivers, and more specifically to an improved rf receiver capable of receiving and detecting input signals with widely differing characteristics.

Several types of rf receivers such as ESM (electronic support measures) and RWR (radar warning receivers) are often required to operate to receive and process signals occurring over a wide range of frequencies and to have an extremely large instantaneous dynamic range so as to receive signals having widely differing amplitude levels. Such receivers must also be able to intercept to detect input signals with different characteristics, such as frequency, timing or phase relation, which may be proximate in time to one another and vary substantially from signal to signal. The signals to be received and detect at these receivers may originate, for example, from a single surveillance radar transmitter or other transmitter in which the frequency and/or timing of the transmitted signals may vary from pulse to pulse. The signals may also originate from a number of radar or other rf transmitters, which may be operating at different frequencies or timing relations.

Even if the input signals can be received and detected sequentially at the receiver, their simultaneous existence may inhibit the receiver from detecting or measuring some of the signals correctly. Furthermore, some of the received signals of interest may have a short duration, for example, in the hundreds of tens of nanoseconds ranges. Without a prior knowledge of the frequency, time-of-arrival, or amplitude of the input signal, the bandwidth of the receiver must be sufficiently large to cover the complete rf band of that signal in order for there to be a high probability of signal intercept. The typical known rf receiver, which has a bandwidth that meets this requirement, is, however, of necessity relatively complicated, bulky and expensive.

It is an object of the present invention to provide a relatively narrow rf bandwidth receiver capable of detecting input signals having varying characteristics.

It is a further object of the invention to provide an rf receiver of the type described which can effectively process and detect signals in a dense electronic environment.

It is another object of the invention to provide an rf receiver having a reduced bandwidth in which cross-correlation techniques can be employed to enhance the probability of signal intercept, and in which the effects of interfering signals are significantly lessened.

To these ends, the receiver of the invention includes a multiple echo delay line, a switch, and a signal-processing receiver. When an rf signal is detected the multiple-pulse output of the delay line, which contains a memory of the past signals, is applied to the input of the signal-processing receiver. Since the delay line has several useful echos, the received signal can be examined in greater detail on each successive echo.

To the accomplishment of the above and to such further objects as may hereinafter appear, the present invention relates to an rf receiver substantially as defined in the appended claims and as described in the accompanying specifications as considered in conjunction with the enclosed drawings in which the single FIGURE is a block diagram of an rf receiver in accordance with an embodiment of the invention.

With reference to the FIGURE, the rf receiver of the invention includes a down converter 10 which receives an input rf signal at an input port 11. The output of converter 10 is applied to the input of an rf coupler 12. One output of coupler 12 is applied to the input of a wide dynamic range i.f. amplifier and detector 14. The detected video output of amplifier-detector 14 is applied to an i.f. switch control 16 and to a down converter frequency control 18.

The other i.f. output of coupler 12 is applied to an i.f. "load" switch 20, which also receives a control signal from i.f. switch control 16 on a control line 22. One output of i.f. switch 20 is connected to the input port of a multiple-echo accoustic delay line 24, which has the characteristic of producing, in response to a pulse at its input port, a series of equally time-spaced pulses of exponentially decreasing amplitudes. The bandwidth of multiple echo delay line 24 is preferably the same as the instantaneous rf bandwidth of the receiver, which is typically in the order of 200 to 300 mHz. One commerically available multiple echo delay line 24 that can be used in the receiver of the invention is the Thomson CSF F5406 0.91 μs delay line.

Another output of i.f. switch 20 is applied to the input of an i.f. amplifier 26 and its amplified i.f. output is applied to one input of an i.f. "unload" switch 28. A second input of i.f. switch 28 is the amplified and detected i.f. output signal of amplifier-detector 14. Switch 28 also receives a control signal from i.f. switch control 16 on a control line 30.

The output of i.f. switch 28 is applied to the input of a frequency measurement or signal-processing receiver 32. The down converter stage of receiver 32 is connected to the output of a local oscillator 34, which receives a control or bias signal from down converter frequency control 18 on a control line 36. The individual components shown in block form in the FIGURE are per se conventional, and are thus not further described in greater detail in this specification.

In the operation of the receiver of the invention, as illustrated in the exemplary embodiment described hereinabove, switch 20 is normally "on" and switch 28 is normally "off" so that a received r.f. signal, after being converted to an i.f. signal in converter 10, is initially caused to impinge on the input port of delay line 24. After a brief delay implemented in i.f. switch control 16 following the arrival of a detected input r.f. signal, which delay is preferably less than one half of the basic delay of delay line 24a, a control from i.f. switch control 16 causes i.f. load switch 20 to be placed in the "off" condition and unload switch 28 to be placed in the "on" condition. This will, in turn, cause the output of the delay line 24 to be connected through amplifier 26 and switch 28 to the input port of the receiver 32 at which the input signal is mixed or down converted with a signal from local oscillator 34. The latter is actuated and its frequency established by the control signal from frequency control 18, which also operates in response to the detected input signal.

During this interval, the i.f. output detect signal from amplifier-detector 14 and the multiple signal echos generated by the multi-echo delay line 24 are applied through conducting i.f. switch 28 to the receiver 32, typically with an exponential amplitude decay between succeeding input echo pulses. The echo signals and the detected i.f. signal will be processed in the receiver in a per se known matter so as to determine or measure certain characteristics of the detected input signal such as its frequency or phase modulation, so a to allow an identification of the source of the signal. After a preset time, which is preferably equal to the number of useful echos from the delay line 24 multiplied by the basic delay period, switch 20 is again placed in the "on" condition so that the delay line input is reconnected through switch 20 to the input port of the input down converter 10, thereby to enable detection of the next signal.

In the receiver of the invention as described, when r.f. activity is detected at detector 14, the receiver 32 is switched into circuit connection with the input of the multiple echo delay line 24. Since the delay line 24 may generate typically between 4 and 7 echos of useful amplitude, the signal can be examined in receiver 32 for greater detail during each successive echo. The resulting shadow time (the time when the delay line 24 is connected to the receiver 32, not to the input port 11), is reduced to the order of a few microseconds without significantly reducing the probability of detection. If signal density is expected to be high, so that additional signal pulses are expected during the shadow time, additional delay lines can be added, so that when one or more delay lines are being loaded by the receiver signals, and are connected to the input port, other delay lines are being unloaded and their output signals measured by the receiver.

For any integer n of useful echos produced in the delay line 24, the instantaneous bandwidth of the receiver 32 can be a fraction of n−1 to n of the instantaneous bandwidth oridinarily required to intercept a given signal. The receiver center frequency can be changed sequentially between the first n−1 echos, so as to acquire the signal. The first or nth echo produced by the multiple echo delay line can serve as a cross-correlation signal to enhance the probability of intercept. Because the delay line 24 does ot distort the signal frequency, such a correlation is very effective. Signal conditioning, such as consecutive filtering, tuning and gain adjustment of the receiver can be performed between the echos, so that interfering signal impacts are greatly reduced.

It will thus be appreciated that the rf receiver of the invention in accordance with the specific embodiment thereof herein above described meets all the ojectives set forth previously. It will also be appreciated that modifications may be made in that embodiment without necessarily departing from the spirit and scope of the invention.

What is claimed is:

1. An rf receiver comprising an input port, a signal-processing receiver, a multiple echo delay line having an input and having the characteristic of producing in response to a pulse at its input a series of time-spaced pulses at decreasing amplitudes, said multiple echo delay line being normally operatively connected to said input port, means for detecting an input rf event switching means effective when in a first state to connect the input of said multiple echo delay line to said input port and when in a second state in response to the detection of an input rf event to operatively connect said multiple echo delay line to the input of said said signal-processing receiver, said switching means comprising a first switch effective when in an "on" condition to operatively connect said multiple echo delay line to said input port, and a second switch effective when in an "on" condition to operatively connect said multiple echo delay line to the input of said signal-processing receiver, and a switch control operatively connected to and providing control signals to said first and second switches, said means for detecting an input rf event comprising means for providing output video and i.f. signals corresponding to the input rf event, said output video signal being applied to said switching means for actuating the latter, said output i.f. signal being applied to one input of said second switch, a second input of said second switch being operatively connected to the input of said multiple echo delay line.

2. The rf receiver of claim 1, in which said switching means includes means effective upon the detection of an input rf event for operatively connecting said multiple echo delay line to the input of said signal-processing receiver a predetermined time following the detection of the input rf event.

3. In a rf receiver which comprises an input port and a signal-processing receiver, switching means operatively connected to said signal-processing receiver, switch control means operatively coupled to said input port and to said switching means, a multiple echo delay line having an input port operatively connected to said switching means and having the characteristic of producing in response to a pulse at its input port a series of time-spaced pulses at decreasing amplitudes, said switch control means being effective upon the detection of an input rf signal event to actuate said switching means, thereby to operatively connect said multiple echo delay line to the input of said signal-processing receiver, said switching means comprising a first switch effective when in an "on" condition to operatively connect said multiple echo delay line to said input port, and a second switch effective when in an "on" condition to operatively connect said multiple echo delay line to said signal-processing receiver, said switch control means being operatively connected to and providing control signals to alternately place said first and second switches in the "on" condition, and means for detecting an input rf event and for providing output video and i.f. signals corresponding to the input rf event, said output video signal being applied to said swich control means for actuating the latter, said output i.f. signal being applied to one input of said second switch, a second input of said second switch being operatively connected to the input port of said multiple echo delay line.

4. The rf receiver of claim 3, in which said switching means includes means effective upon the detection of an input rf event for operatively connecting the input port of said multiple echo delay line to the input of said signal-processing receiver after a predetermined period following the detection of the input rf event.

* * * * *